United States Patent
Hyslop et al.

(10) Patent No.: US 7,751,822 B2
(45) Date of Patent: Jul. 6, 2010

(54) SYSTEMS AND METHODS FOR FREQUENCY REUSE IN WIRELESS NETWORKS

(75) Inventors: Douglas A. Hyslop, Vienna, VA (US); Matthew Starzec, Fairfax, VA (US); Udit Thakore, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1311 days.

(21) Appl. No.: 11/201,116

(22) Filed: Aug. 11, 2005

(65) Prior Publication Data

US 2006/0205422 A1   Sep. 14, 2006

Related U.S. Application Data

(60) Provisional application No. 60/661,025, filed on Mar. 14, 2005.

(51) Int. Cl.
*H04W 40/00*   (2009.01)
(52) U.S. Cl. ........................ 455/447; 455/446; 455/448; 455/449; 455/450; 455/451
(58) Field of Classification Search ......... 455/446–451; 370/328–330
See application file for complete search history.

(56) References Cited

U.S. PATENT DOCUMENTS

| | | | |
|---|---|---|---|
| 5,459,759 A * | 10/1995 | Schilling | 375/133 |
| 5,551,060 A * | 8/1996 | Fujii et al. | 455/447 |
| 5,649,292 A * | 7/1997 | Doner | 455/447 |
| 5,953,661 A | 9/1999 | Schwinghammer et al. | |
| 6,078,815 A * | 6/2000 | Edwards | 455/450 |
| 6,212,385 B1 | 4/2001 | Thomas et al. | |
| 6,363,261 B1 | 3/2002 | Raghavan | |
| 6,853,845 B2 | 2/2005 | Hsu et al. | |
| 2005/0025093 A1* | 2/2005 | Yun et al. | 370/328 |
| 2005/0250502 A1* | 11/2005 | Laroia et al. | 455/447 |
| 2005/0282550 A1* | 12/2005 | Cho et al. | 455/447 |

FOREIGN PATENT DOCUMENTS

WO   WO 01/78255 A1   10/2001

OTHER PUBLICATIONS

International Search Report and Written Opinion dated Aug. 8, 2007 for PCT/US06/08912.
International Preliminary Report on Patentability dated Sep. 18, 2007 for PCT/US06/08912.

* cited by examiner

*Primary Examiner*—Edward Urban
*Assistant Examiner*—Fayyaz Alam

(57) ABSTRACT

A frequency reuse scheme that provides high spectral efficiency and reduced interference in areas where cell sites overlap is provided. Three frequencies are allocated per cell site, with each sector employing two frequencies, one frequency being transmitted at a higher power and the second frequency being transmitted at a lower power. The higher power frequency in one sector differs from the higher power frequency employed in the other two sectors, and the lower power frequency used in one sector differs from the lower power frequency used in the other two sectors.

15 Claims, 3 Drawing Sheets

SYSTEMS AND METHODS FOR FREQUENCY REUSE IN WIRELESS NETWORKS

The present application claims priority under 35 U.S.C. §119 to U.S. Provisional Patent Application No. 60/661,025, filed Mar. 14, 2005, the entire disclosure of which is herein expressly incorporated by reference.

BACKGROUND OF THE INVENTION

Wireless networks, such as cellular networks, typically employ radio frequency spectrum allocated by governmental bodies. Governmental bodies allocate the radio frequency spectrum between a number of wireless network operators. Additionally, only certain portions of the radio frequency spectrum is useable for wireless networks. Accordingly, radio frequency spectrum is a scarce and valuable resource that needs to be used as efficiently as possible, which is commonly referred to as spectral efficiency. In cellular networks, frequency reuse, i.e., how often frequencies are reused in different cell sites, is a common measure of spectral efficiency.

One limiting factor on spectral efficiency is signal-to-noise ratio (SNR). Wireless voice communications typically require an SNR above a particular threshold level in order to provide a voice call. Because voice calls only require SNR levels just above the particular threshold level, little benefit is seen by providing an SNR level much higher than the particular threshold level in voice-only wireless networks. Rather, the goal for a voice-only network is to consistently provide an SNR level as close to the particular threshold level as possible in order to minimize the power transmitted to that particular wireless device, as excess power will create unnecessary interference to other wireless devices.

In contrast to voice communications, data communications can typically be provided for a variety of SNR levels, where the greater the SNR, the higher the data rate that can be provided. Because providing high data rates is an area of fierce competition between wireless network operators, these network operators desire to provide the highest possible data rates, while still using their allocated spectrum as efficiently as possible.

Wireless data communications are typically provided by sectorized cells. A sectorized cell is one in which the cell is divided into a number of different geographical sectors, each providing different sets of channels. One frequency reuse scheme for sectorized cells is referred to as universal frequency reuse, which is also referred to as N=1×1 frequency reuse. Universal frequency reuse employs the same frequency, or frequencies, in each sector of every cell site. Universal frequency reuse is currently used in 1×EV-DO, F-OFDM, UMTS and other technologies.

Because universal frequency reuse employs the same frequencies throughout the network, high spectral efficiency is attained. However, this also results in considerable interference in areas where cells overlap, which reduces data rates in these areas. The increased interference affects both overlap boundary areas between different cell sites, as well as sector boundary areas within the same cell site. Universal frequency reuse technologies experience an equal-power boundary in between two sectors, thereby resulting in a low SNR and correspondingly low data rates even when wireless devices are geographically close to the base station. These areas of high interference reduce data rates in a significant portion of the wireless data network coverage area, thereby impacting the end user data experience.

Another frequency reuse scheme assigns three frequencies to each cell site, with each of the three sectors employing a different frequency, which is commonly referred to as a N=1×3 frequency reuse. Adjacent cells are arranged such that the sectors of adjacent cells which overlap each use different frequencies. Although this technique improves the SNR in areas where cell boundaries overlap, spectral efficiency is reduced compared to the universal frequency reuse because frequencies are used only ⅓ as often.

Yet another frequency reuse scheme is to allocate three 1.25 MHz carriers to each sector, with each of the carriers being allocated at a different power level within the sector. For example, the highest power carrier in sector 1 would be assigned to sector 2 with a power level approximately 6 db lower than in sector 1, and to sector 3 with a power level approximately 12 db lower. The other carriers are similarly staggered over the sectors. Adjacent cells are designed such that areas of overlap have different frequencies being transmitted with the highest power level, which results in reduced interference in the overlap regions between cells. However, near the center of the cell site, this results in the third, lowest power carrier experiencing average SNR levels several dBs worse than the SNR provided by the two higher-power carriers. Additionally, wireless devices near the center of the cell site are forced to be served on the lowest-power carrier, which degrades the overall sector throughput.

SUMMARY OF THE INVENTION

The present invention overcomes the above-identified and other deficiencies of prior frequency reuse schemes by providing high spectral efficiency and reduced interference in areas where cell sites overlap. Specifically, the present invention provides three or more frequencies per cell site, with each sector employing two frequencies, one frequency being transmitted at a higher power and the second frequency being transmitted at a lower power. The higher power frequency in one sector differs from the higher power frequency employed in the other two sectors, and the lower power frequency used in one sector differs from the lower power frequency used in the other two sectors.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
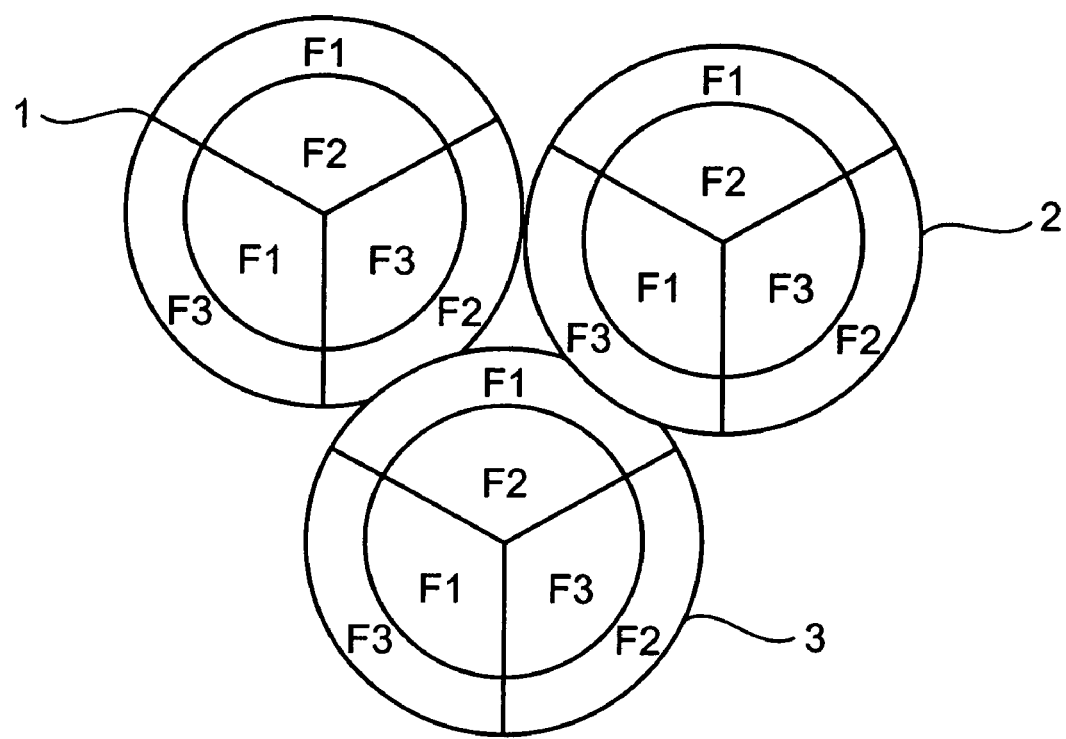
FIG. 1 illustrates an exemplary frequency reuse scheme in accordance with the present invention.

As illustrated in FIG. 1, in accordance with exemplary embodiments of the present invention, each cell site is allocated three frequencies, F1, F2 and F3. It should be recognized that as used herein, the term frequency can refer to a single frequency or a number of frequencies constituting a frequency band. The frequencies which are illustrated as providing coverage to the inner portions of the cell site are the lower power frequencies, while those illustrated as providing coverage at the outer portions of the cell site are the higher power frequencies. The difference in power levels between the high and low power frequencies can be, for example, 6 dB. However, depending upon implementation the difference in power levels can be greater than or less than 6 dB. As illustrated in FIG. 1, in cell 1, frequency F1 is transmitted at a higher power in a first sector and at a lower power in a second sector; frequency F2 is transmitted at a higher power in a third sector and at a lower power in the first sector; and frequency F3 is transmitted at a higher power in the second sector and a lower power in the third sector.

To reduce interference in areas where cell site boundaries overlap, cell sites are arranged such that the higher power frequencies in the overlap regions are different frequencies. Accordingly, as illustrated in FIG. 1, cell site 1 transmits frequency F2 at a higher power into the same geographical region as cell site 2 transmits frequency F3 and cell site 3 transmits frequency F1. Similarly, cell site 2 transmits frequency F3 into the same geographical area as cell 3 transmits frequency F1. Accordingly, the present invention provides an effective frequency reuse of N=1×3 for regions where cell sites overlap, i.e., handover regions, which is where performance is typically the lowest for universal frequency reuse systems.

Assuming a uniform distribution of wireless devices, the present invention provides a frequency reuse scheme that results in the highest sector data capacity compared to prior reuse schemes, while providing data rates higher than those of universal frequency reuse schemes in the areas where cell site coverage areas overlap. Moreover, the present invention supports greater medium access control (MAC) state capacity than N=1×3 reuse, thereby increasing the number of simultaneous users per sector.

In addition to the reduction of interference in the areas where cell site boundaries overlap, the present invention provides a similar interference reduction to the boundary areas between sectors. Using cell site 1 in FIG. 1 as an example, a wireless device being served on the low-power carrier F2 and traveling clockwise around the base station would hand-up to the higher power carrier F1 and then handoff to either the low-power carrier F3 or the high-power carrier F2 in the next sector to the right. Alternatively, if the device were traveling counter-clockwise, then the device would handoff directly to the high-power carrier F3 in the next sector to the left, then hand-down to the low-power carrier in that sector as the SNR improves away from the sector boundary.

Figure 2:
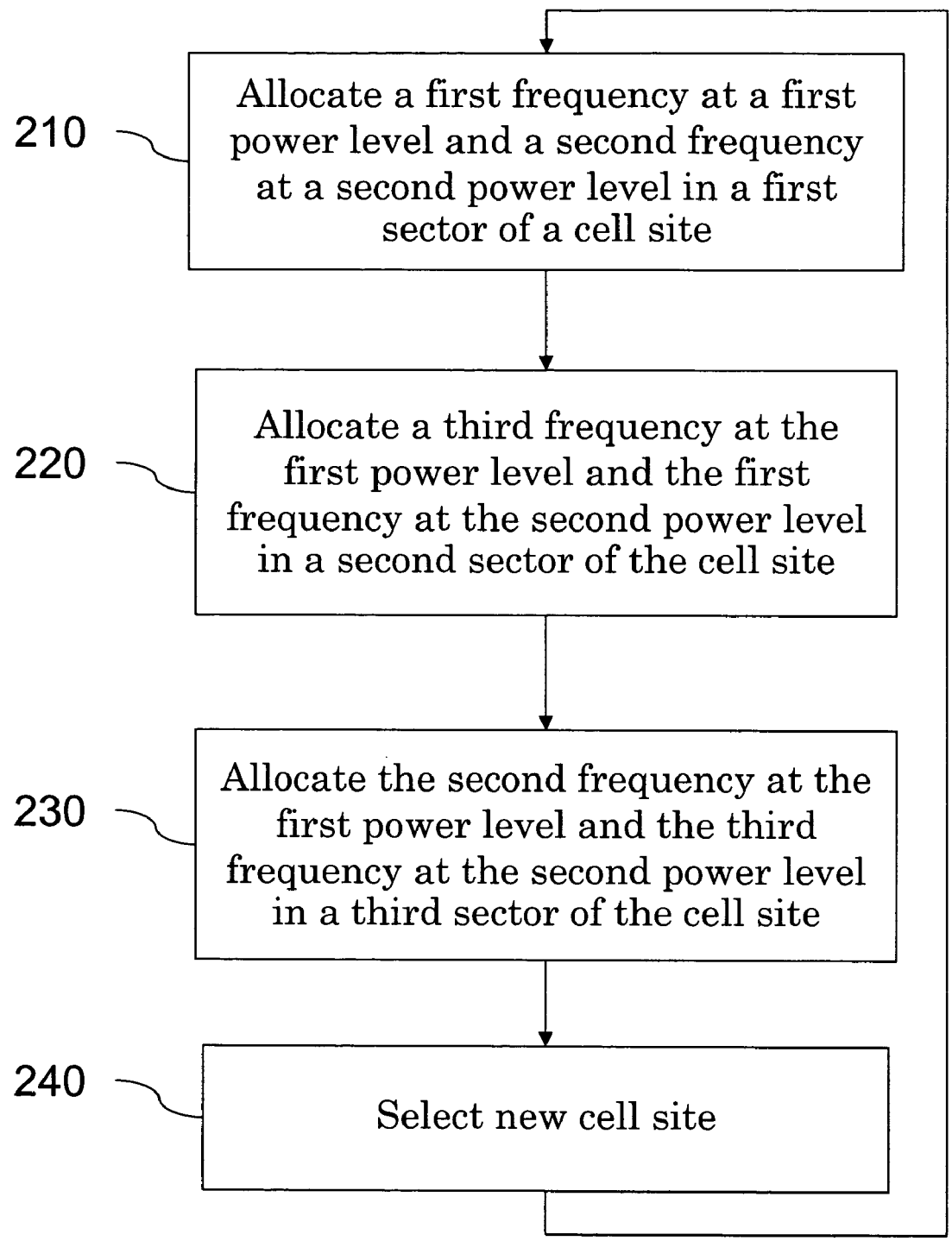
FIG. 2 illustrates an exemplary method for allocating frequencies to a base station using the frequency reuse scheme illustrated in FIG. 1.

FIG. 2 illustrates an exemplary method for allocating frequencies for the frequency reuse scheme illustrated in FIG. 1. Initially, a first frequency at a first power level and a second frequency at a second power level are allocated in a first sector of a cell site (step 210). Next, a third frequency at the first power level and the first frequency at the second power level are allocated in a second sector of the cell site (step 220). Finally, the second frequency at the first power level and the third frequency at the second power level are allocated in a third sector of the cell site (step 230). Another cell site is selected (step 240) and the process is repeated in such a way that the areas of overlap between different cell sites have different frequencies operating at the first power level.

The method described above in connection with FIG. 2 can be performed by a computer or the like. Specifically, the method can be embodied in computer storage medium, and can include instructions for executing the method on a processor or the like.

Figure 3:
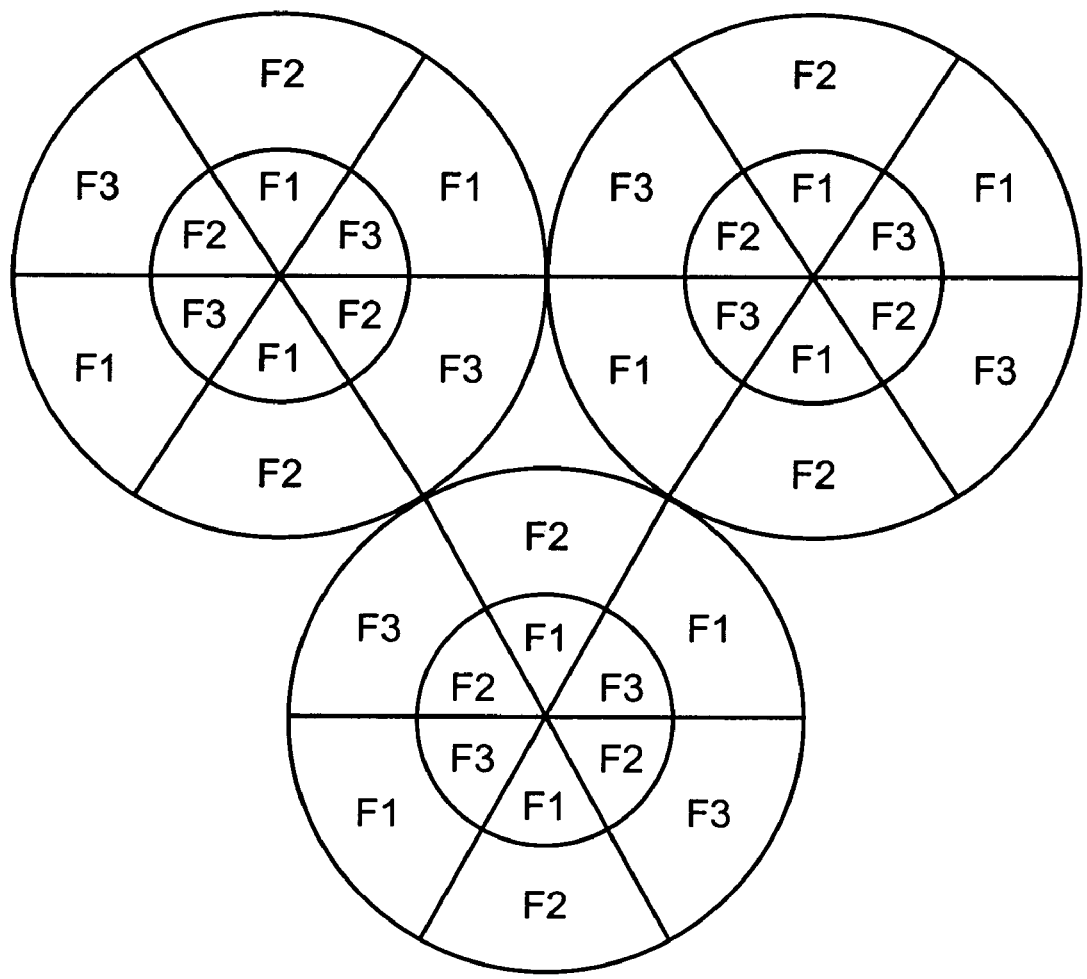
FIG. 3 illustrates an exemplary frequency reuse scheme in accordance with another embodiment of the present invention.

Although exemplary embodiments have been described in connection with three sector cell sites and three allocated frequencies, the present invention is not so limited. For example, FIG. 3 illustrates a wireless network with six sector cell sites in accordance with the present invention. Conventional six sector cell sites allocated with three total frequencies will reuse the frequencies in every sector, thereby resulting in the same SNR issues discussed above with regard to universal frequency reuse systems. Alternatively, a conventional six sector cell site may be assigned six frequencies, and use three frequencies per sector to achieve a 1×2 reuse. Although this 1×2 reuse pattern provides better SNR in the sector and cell boundary areas, this improvement is provided at the expense of spectral efficiency—as each sector employs three frequencies instead of six.

The reuse patterns of the present invention as illustrated in FIG. 3, provide similar SNR levels at the cell and sector boundary areas as the 1×2 frequency reuse schemes. When three frequencies are assigned to the configuration, then each sector operates with two frequencies in a rotating pattern as illustrated in FIG. 3. The inter-sector handoff operates in a similar manner to that described above in connection with the three sector cells.

Although FIG. 3 illustrates three frequencies being used in the cell, six or more frequencies can be employed by imitating the reuse pattern for the three frequency embodiment described above in connection with FIGS. 1 and 2. Within each reuse set, two frequencies are assigned per sector, similar to that illustrated in FIG. 1. The sector throughput advantage of this scheme over the traditional 1×2 reuse pattern for a six-sectored configuration with six frequencies is in providing a fourth carrier per sector (e.g., F2, F3, F5 and F6) versus three carriers for the 1×2 reuse case.

The present invention is applicable to any type of wireless technology, and in particular is especially useful for technologies for data services with adaptive modulation techniques that employ universal frequency reuse. For example, the present invention can be used in Orthogonal Frequency Division Multiple Access (OFDMA), Code Division Multiple Access (CDMA), or other types of similar systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for frequency allocation in a wireless network, comprising the acts of:
    allocating a first frequency at a first power level and a second frequency at a second power level in a first sector of each of a plurality of cell sites in the network;
    allocating a third frequency at the first power level and the first frequency at the second power level in a second sector of each of the plurality of cell sites in the network; and
    allocating the second frequency at the first power level and the third frequency at the second power level in a third sector of each of the plurality of cell sites in the network, wherein each sector is allocated at most two frequencies and wherein the first, second and third sectors of each of the plurality of cell sites in the network are arranged such that portions of each of the plurality of cell sites overlapping portions of other cell sites of the plurality of cell sites include different frequencies.

2. The method of claim 1, wherein the first power level is higher than the second power level.

3. The method of claim 1, wherein the wireless network employs orthogonal frequency division multiple access (OFDMA) over an air interface.

4. The method of claim 1, wherein the wireless network employs code division multiple access (CDMA) over an air interface.

5. A method for frequency allocation in a wireless network, comprising the acts of:
- allocating a first frequency at a first power level and a second frequency at a second power level in a first sector of each of a plurality of cell sites in the network;
- allocating a third frequency at the first power level and the first frequency at the second power level in a second sector of each of the plurality of cell sites in the network; and
- allocating the second frequency at the first power level and the third frequency at the second power level in a third sector of each of the plurality of cell sites in the network, wherein each sector communicates using only the first and second power levels and wherein the first, second and third sectors of each of the plurality of cell sites in the network are arranged such that portions of each of the plurality of cell sites overlapping portions of other cell sites of the plurality of cell sites include different frequencies.

6. The method of claim 5, wherein the first power level is higher than the second power level.

7. The method of claim 5, wherein the wireless network employs orthogonal frequency division multiple access (OFDMA) over an air interface.

8. The method of claim 5, wherein the wireless network employs code division multiple access (CDMA) over an air interface.

9. A method for frequency allocation in a wireless network, comprising the acts of:
- allocating a first pair of frequencies to a first sector of each of a plurality of cell sites in the network;
- allocating a second pair of frequencies to a second sector of each of the plurality of cell sites in the network;
- allocating a third pair of frequencies to a third sector of each of the plurality of cell sites in the network,
- wherein each pair of frequencies are allocated at first and second power levels and at least one frequency of the pair of frequencies allocated to the first and second sectors is not allocated to the third sector and wherein the first, second and third sectors of each of the plurality of cell sites in the network are arranged such that portions of each of the plurality of cell sites overlapping portions of other cell sites of the plurality of cell sites include different frequencies.

10. The method of claim 9, wherein the first power level is higher than the second power level.

11. The method of claim 9, wherein the wireless network employs orthogonal frequency division multiple access (OFDMA) over an air interface.

12. The method of claim 9, wherein the wireless network employs code division multiple access (CDMA) over an air interface.

13. The method of claim 1, wherein each of the plurality of cell sites includes six sectors.

14. The method of claim 5, wherein each of the plurality of cell sites includes six sectors.

15. The method of claim 9, wherein each of the plurality of cell sites includes six sectors.

* * * * *